May 12, 1959  J. KONRAD ET AL  2,886,014
INJECTION NOZZLE
Filed July 5, 1957  2 Sheets-Sheet 2
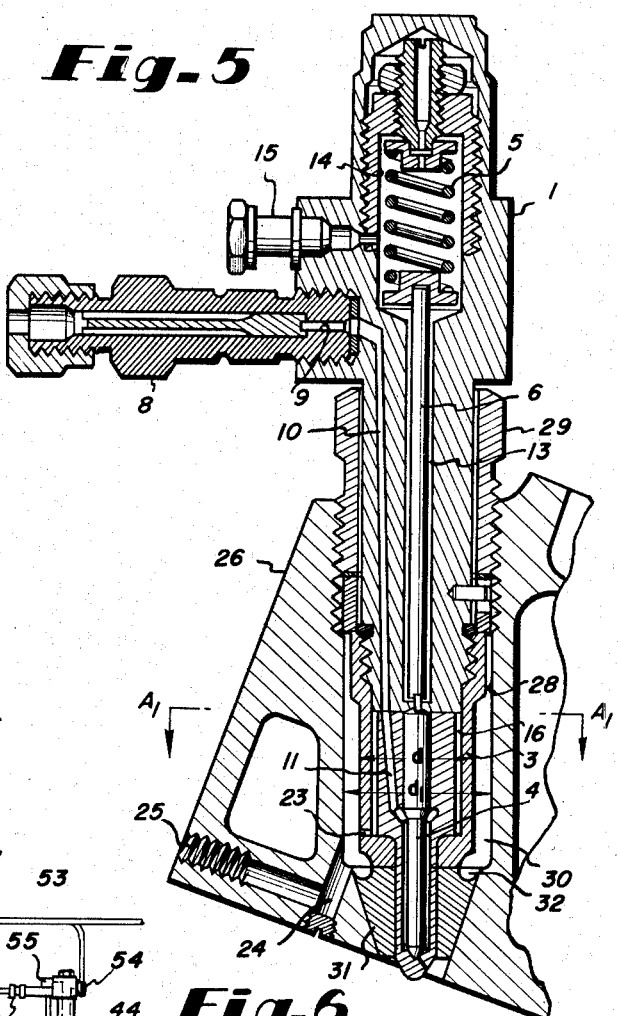
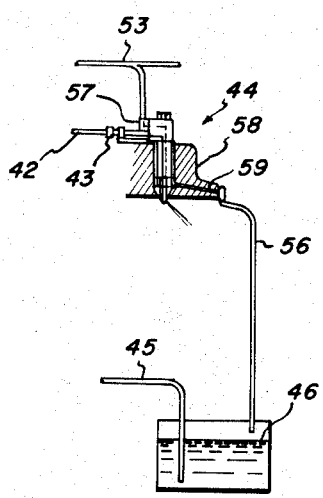
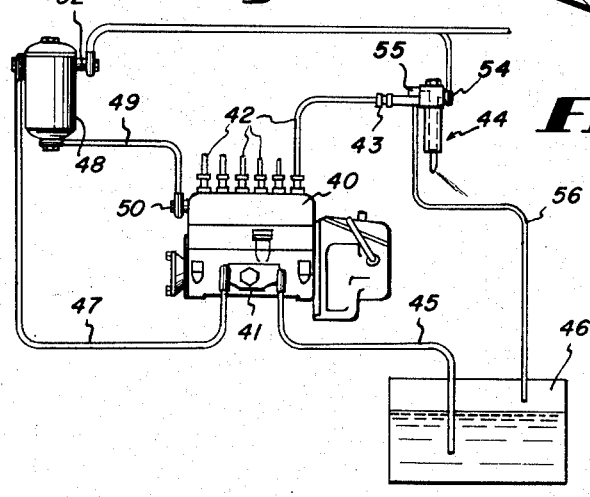
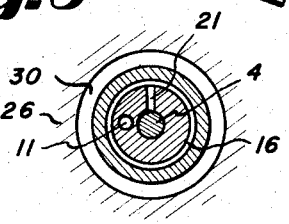
INVENTORS
JAKOB KONRAD
HEINZ-JÜRGEN RAMUNDT
BY Taulmin & Taulmin
ATTORNEY United States Patent Office 2,886,014
Patented May 12, 1959

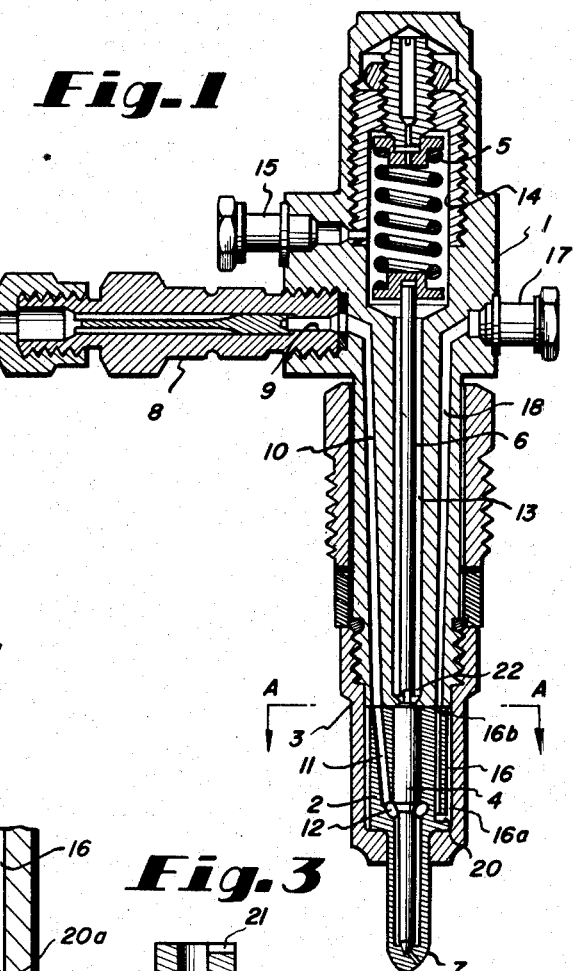
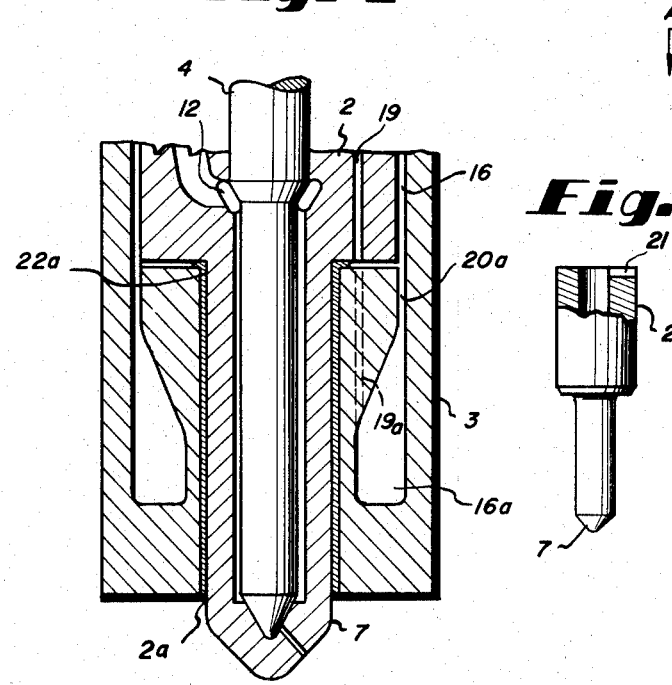

2,886,014

INJECTION NOZZLE

Jakob Konrad and Heinz-Jürgen Ramundt, Nurnberg, Germany, assignors to Man, Maschinenfabrik Augsburg-Nurnberg AG, Nurnberg, Germany Application July 5, 1957, Serial No. 670,280

Claims priority, application Germany July 6, 1956

5 Claims. (Cl. 123—32)

The present invention relates to fuel injection nozzles for internal combustion engines. More in particular, the present invention relates to fuel cooled fuel injection nozzles for internal combustion engines, and more particularly still to fuel cooled injection nozzles in which the cooling fuel is circulated separately from the injection fuel.

It is well known that during the operation of injection nozzles in internal combustion engines a considerable amount of heat is developed and the injection nozzle must therefore be cooled constantly and efficiently.

There have become known in the art a number of cooling systems for cooling the injection nozzles of internal combustion engines either by means of water or other cooling agents, particularly the fuel with which the engine is driven as, for instance gasoline or oil.

It has, for example, been proposed to cool the injection nozzle by means of circulating cooling water. According to this construction the nozzle holder mounted upon the cylinder head is cooled by cooling water which circulates about the nozzle, thus coming into immediate contact with the exterior surface of the latter. Because of immediate contact between the cooling water and the injection nozzle, the latter has to be carefully sealed in order to prevent water from entering the nozzle and particularly the cylinder, upon which the nozzle is mounted. These very accurate sealing means constitute an additional expenditure. In addition, the cooling water has to be drained from the cooling system whenever the injection nozzle is to be removed from the cylinder for replacement or repair as otherwise water would enter the interior of the cylinder.

It is also known to cool the injection nozzle of internal combustion engines by circulating a cooling liquid, as, for example, fuel consisting of oil or gasoline through at least two borings arranged in the nozzle holder in parallel direction to the longitudinal axis of the latter and through a cooling jacket surrounding the nozzle body. In this construction the cooling proper is effected by the circulation of the cooling liquid within the hollow space defined by the interior surface of the cooling jacket, and the exterior surface of the nozzle body, and one of the borings is used for feeding the cooling liquid to the cooling chamber, while the second of the borings is required in order to convey the cooling liquid out of and away from the cooling chamber. This construction suffers from the drawback that two borings are required for circulating the cooling liquid. This cooling system therefore requires considerable space and consequently is not applicable to small and medium size motors, and particularly vehicle motors where considerations of economy as to size and weight are of vital important.

In practice, the cooling system just described is useful only in connection with very large motors, as for instance stationary, high capacity motors for impelling generators.

It is the principal object of the present invention to provide an apparatus for cooling the injection nozzles of internal combustion engines which is simpler and more economical than known cooling devices.

It is a particular object of the present invention to provide an apparatus for cooling the injection nozzles of internal combustion engines which requires comparatively little space.

It is another object of the present invention to provide an apparatus for cooling the injection nozzles of internal combustion engines which results in a more efficient cooling of the injection nozzle.

It is a further object of the present invention to provide an apparatus for cooling the injection nozzles of internal combustion engines by means of cooling fuel which can be returned to the fuel tank after cooling the injection nozzle without unduly heating the injection fuel contained in the fuel tank prior to the injection into the cylinder.

It is still a further object of the present invention to provide a cooling unit for cooling the injection nozzles of internal combustion engines by means of cooling fuel circulated between the fuel tank and the cooling chamber of the injection nozzle which fully utilizes the kinetic energy produced by the conveyor pump conveying the fuel to the injection nozzle.

These objects are achieved by the cooling system and the injection nozzle of the present invention which uses fuel as the cooling agent and, at the same time eliminates the second longitudinal boring for conveying cooling fuel, by conveying the cooling fuel away from the cooling chamber together with the leakage oil of the injection fuel.

According to a further feature of the present invention, the oil leakage pipe which is common to practically all fuel injection nozzles and which is arranged in the nozzle holder is employed for conveying the cooling fuel out of the cooling chamber. This is made posible by connecting the oil leakage pipe with the cooling chamber wherein the cooling liquid circulates around the nozzle body, preferably by means of a connecting groove or boring.

Since the cooling fuel utilizes the means for conveying the leakage oil out of the injection nozzle a second return boring for the cooling fuel is unnecessary.

A further embodiment of the invention is applicable to fuel injection nozzles wherein the nozzle body is attached to the nozzle holder by means of a sleeve or cap nut. According to this embodiment, the cooling effect is enhanced by providing a sleeve or cap nut having an elongated portion flush with the lower end of the nozzle body and providing for an additional cooling chamber formed by this elongated portion of the sleeve nut.

According to still another embodiment of the present invention the cooling fuel is conveyed from the cooling chamber away from the injection nozzle through borings in the cylinder head which are simultaneously used for removing the leakage oil. The cooling chamber communicates with borings in the adjoining portions of the cylinder head via borings within the sleeve nut.

According to still a further embodiment of the present invention, the boring in the cylinder head receiving the nozzle holder has a width exceeding that of the lower portion of the sleeve nut. Thus a hollow space is formed which can be used as a supplementary cooling chamber and the cooling effect can be considerably improved because of this construction.

The invention will be better appreciated upon the following description of the accompanying drawings, wherein:

Figure 1 is a longitudinal sectional view of the injection nozzle of the invention, also showing the conduits used for carrying out the cooling method of the present invention;

Figure 2 is a cross-sectional view of the injection nozzle of Figure 1 taken along the line A—A showing the portion of the injection nozzle below the line A—A;

Figure 3 is an elevational view of the nozzle body of an injection nozzle;

Figure 4 is an elevational view partly in longitudinal section of the lower portion of another embodiment of the injection nozzle of the invention;

Figure 5 is a longitudinal sectional view of still another embodiment of the injection nozzle of the invention, which also illustrates the conduits used for a further embodiment of the cooling method of the invention;

Figure 6 is a cross-sectional view along the line $A_1$—$A_1$ of Figure 5 and shows the portion of the injection nozzle below the line $A_1$—$A_1$;

Figure 7 is a diagram showing the entire cooling unit of the invention;

Figure 7a is a diagram showing another embodiment of the cooling unit of the invention.

Referring now more in particular to the drawings wherein the same parts are identified by the same reference numerals, Figure 1 shows the nozzle body 2 which is mounted upon the nozzle holder 1 by means of the sleeve nut 3, so as to firmly contact the nozzle holder in the contacting surface plane A—A, i.e. the plane in which the nozzle holder and nozzle body contact each other. The pintle 4 is arranged within the nozzle body 2 and it is pressed against its seat 7 by the pressure spring 5 mounted in the upper part of the nozzle holder 1 and pressing against the spring plate bolt 6 which, in turn, presses the pintle 4 against the seat 7. The injection fuel is conducted to the injection nozzle through a boring 9 provided in the center of the pressure pipe sleeve 8. The boring 9 communicates with a boring 10 provided in the nozzle holder 1 in longitudinal direction of the injection nozzle. The boring 10 ends in a boring 11 provided in the nozzle body 2 and the injection fuel is thus conducted to the pressure chamber 12 in which the pressure created by the injection of the fuel actuates the pintle 4 in a manner known per se. The leakage oil separated from the injection fuel during the operation of the injection nozzle and which enters the chamber 13 is conducted out of the injection nozzle via the spring chamber 14 and the pressure pipe sleeve 15.

The annular cooling chamber 16 is formed between the nozzle body 2 and the sleeve nut 3. The cooling fuel enters the lower end 16a of this cooling chamber 16 via the pressure pipe socket 17, the boring 18 provided within the nozzle holder 1, another boring 19 provided in the nozzle body 2, and preferably an additional boring 20.

According to the present invention, the annular cooling chamber 16 is provided at its upper end 16b with a transverse groove or boring 21 and through this groove or boring communicates with the lower end 22 of the leakage oil conduit 13. Both the leakage oil and the cooling fuel are thus conducted to the outside of the injection nozzle via the same conduit, i.e. the leakage oil conduit 13, and a separate return conduit for the injection fuel is unnecessary. In the case of an injection nozzle of the type shown in Figure 1 of the drawings, the transverse groove 21 is arranged in the contacting surface plane A—A in which the nozzle body and the nozzle holder are attached to each other by the sleeve nut 3. This ensures the simplest and most economical construction and manufacture of the connecting groove or boring 21 in the particular nozzle type shown in this figure. However, with other types of injection nozzles, it may be found to be of advantage to position the connecting groove or boring 21 differently within the range of the upper end of the annular chamber 16 or the lower end 22 of the leakage oil conduit 13. The adaptation of the positioning of groove 21 to the particular type of injection nozzle will be well within the reach of a person skilled in the art.

According to another embodiment of the present invention shown in Figure 4 of the drawings, the sleeve nut 3 is elongated so as to contact the lower end 2a of the nozzle body 2. The advantage of this embodiment over the embodiment shown in Figures 1 to 3 lies in the fact that because of the elongated configuration of sleeve nut 3, the volume of the annular cooling chamber 16 is increased by an additional annular cooling chamber 16a. This allows for a more efficient cooling of the injection nozzle especially at its end facing the combustion chamber in which the greatest amount of heat is produced. In this embodiment the sleeve nut 3 is preferably carefully sealed against the combustion chamber (not shown) by sealing means 22a in order to prevent cooling fuel from entering the combustion chamber. The annular cooling chamber 16a communicates with the supply boring 19 and the cooling chamber 16 via borings 19a and 20a. The cooling chamber 16 communicates with the leakage oil conduit 13 in the same manner as described in regard to the embodiment shown in Figures 1 to 3.

According to still another embodiment of the invention a separate return conduit is provided for conducting the cooling fuel out of the injection nozzle, but the leakage oil conduit is used as a supply conduit for feeding the cooling fuel to the cooling chamber and a separate supply conduit can therefore be dispensed with. According to this embodiment which is shown in Figure 5 of the drawings, the annular chamber 16 is supplied with cooling fuel from the leakage oil conduit 13, the latter communicating with the cooling chamber 16 via a transverse groove 21 provided in the contacting surface plane $A_1$—$A_1$. The cooling fuel is returned to the outside of the injection nozzle through borings 23, 24, 25 which are provided within the sleeve nut 3 and the surrounding portion of the cylinder head 26. The boring 25 is connected to the return conduit system to be described further below. By shutting conduit 25 of the cylinder head 26 the cooling fuel can be drained from the injection nozzle via the conduit 24. The leakage oil of the injection fuel is led out of the injection nozzle together with the cooling fuel through one and the same conduit.

According to yet another embodiment of our invention, the injection nozzle is even more effectively cooled particularly at its lower end in the direction of the combustion chamber of the cylinder with which the injection nozzle is associated. The nozzle holder is mounted in the cylinder head 26 by means of sleeve nut 29, in a boring 28. According to this embodiment the boring 28 has a diameter $d_1$ at least in the region of the nozzle body 2 which is greater than the external diameter of sleeve nut 3. Thereby an additional annular cooling chamber 30 is created in the region of the nozzle body 2. It is defined by the wall of boring 28 and the outer wall of sleeve nut 3 and communicates with the cooling chamber 16 via a boring 23. The additional cooling chamber 30 also communicates with the drainage borings 24 and 25 in the cylinder head.

A sealing cone 31 may be provided about the lowermost end of the injection nozzle within the cylinder head 26. In that case, this sealing cone can be provided with an annular groove 32, communicating with the cooling chamber 30 and thus contribute to enlarge the available cooling space.

Turning now to a description of the cooling unit of the invention as a whole shown diagrammatically in Figures 7 and 7a of the accompanying drawings, and referring first to the embodiment illustrated in Figure 7, the fuel injection pump 40 is in communication with a conveyor pump 41 and injection conduits 42. The injection conduits 42 are each connected to an injected nozzle via a pressure pipe sleeve, but for the sake of clarity of the drawing only one of the injection conduits 42 is shown in the drawings with its corresponding injection nozzle 44 and the connecting pressure pipe sleeve 43.

Conveyor pump 41 pumps the fuel contained in the fuel tank 46 via conduits 45 and 47 to the fuel filter 48. After passing through filter 48 the fuel travels via conduct 49 to the connecting sleeve 50 of the injection pump 40 or, more specifically to the injection conduits 42. Whereas in conventional cooling units any excessive fuel conveyed through the conduit 47 and not consumed as injected fuel is returned to the fuel tank 46 via conduit 53 and by means of a super pressure valve 52 arranged at the fuel filter 48, the present invention utilizes this excessive fuel for cooling the injection nozzle.

The cooling fuel is conducted from the conduit 53 to the pressure pipe sleeve 54 (corresponding to sleeve 17 of Figure 1) associated with the injection nozzle 44. The cooling fuel leaves the injection nozzle at 55 via an oil leakage conduit of the kind shown in Figures 1 or 5 and described further above. Upon leaving the injection nozzle, the cooling fuel is returned to the fuel tank via conduit 56.

Another embodiment of the cooling unit of the invention is shown in Figure 7a of the drawings, wherein pressure pipe sleeve 57 corresponds to sleeve 15 communicating with conduit 13 forming the supply line of the cooling fuel in Figure 5. The pressure pipe sleeve 57 of the cooling unit shown in Figure 7a communicates with conduit 53 and is connected to the injection nozzle 44. The cooling fuel enters the cooling chamber of the injection nozzle via conduit 53 and through pressure pipe sleeve 57, and, after having cooled the injection nozzle, leaves the same via boring 59 (corresponding to borings 24, 25 of Figure 5) in the cylinder head 58 (designated by reference numeral 26 in Figure 5). The cooling fuel is then returned to the fuel tank 46 via conduit 56.

In many instances injection fuel is advanced in ample quantity by the conveyor pump, and a sufficient amount of excessive fuel not needed for injection is available for cooling purposes. In some cases, however, and particularly in internal combustion engines having a plurality of cylinders, the excessive fuel transported by the conveyor pump may not be sufficient. In such cases the cooling unit of the invention is equipped with means for increasing the conveying capacity of the conveyor pump.

The embodiments shown and described are to be considered as primarily illustrative and various other embodiments incorporating the present invention will readily appear to any person skilled in the art. For example, the direction of circulation of the cooling fuel in the injection nozzle shown in Figure 1 may be reversed, i.e. the cooling fuel can be supplied via the pressure pipe sleeve 15 and released from the injection nozzle via sleeve 17.

*Advantages.*—The various embodiments of the present invention offer considerable advantages:

The embodiment shown in Figures 1 to 3 is less complicated than known constructions because the cooling fuel is released from the cooling chamber in the injection nozzle via the leakage oil conduit and a separate return conduit only for the cooling fuel is no longer required.

It also ensures a better cooling of the nozzle holder, since the cooling fuel is returned via the oil leakage pipe in a direction parallel to the longitudinal axis of the injection nozzle.

The embodiment shown in Figure 4 ensures a more thorough cooling of the injection nozzle because of the enlarged cooling chamber provided in the elongated portion of the sleeve nut.

The embodiment shown in Figures 5 and 6 is less complicated than known constructions as it is unnecessary to provide a separate supply conduit for conveying the cooling fuel to the cooling chamber.

The embodiment shown in Figure 5 is also capable of producing a still greater and more efficient cooling effect because it is provided with an additional annular cooling chamber.

The entire cooling unit of the invention shown in Figures 7 and 7a is more efficient because the excessive fuel advanced by the conveyor pump not used for injection is fully utilized for the cooling operation of the injection nozzle. Thus, the kinetic energy produced by the conveyor pump is entirely used and is not partly wasted.

It will be understood that this invention is susceptible to modification in order to adapt it to different usages and conditions, and, accordingly, it is desired to comprehend such modifications within this invention as may fall within the scope of the appended claims.

What we claim is:

1. In a fuel injection system, the combination of a cooled injection nozzle having first inlet means for receiving fuel to be injected by the nozzle, second inlet means for receiving fuel which acts as a coolant, and outlet means common to both the fuel acting as coolant and to leakage of fuel supplied to said first inlet means; a fuel reservoir; pump means in communication with said fuel reservoir and with both of said inlet means of said injection nozzle for supplying to said first inlet means sufficient fuel to effect fuel injection by said nozzle and for supplying to said second inlet means sufficient fuel to effect cooling of said nozzle; and conduit means placing said outlet means of said injection nozzle in communication with said fuel reservoir.

2. In a fuel injection system, the combination of a cooled injection nozzle having first inlet means for receiving fuel to be injected by the nozzle, second inlet means for receiving fuel which acts as a coolant, and outlet means common to both the fuel acting as coolant and to leakage of fuel supplied to said first inlet means; a fuel reservoir; injection pump means having an exhaust in communication with said first inlet means of said nozzle for pumping fuel thereto; conveyor pump means having an intake in communication with said fuel reservoir and an exhaust in communication with an intake of said injection pump means as well as with said second inlet means of said nozzle, said conveyor pump means being of such strength as to supply said injection pump means with sufficient fuel to permit the same to supply said nozzle with a quantity of fuel sufficient to effect fuel injection as well as to supply said second inlet means with sufficient fuel to effect cooling of said nozzle; and conduit means placing said outlet means of said injection nozzle in communication with said fuel reservoir.

3. The combination defined in claim 2 further comprising filtering means interposed between the exhaust of said conveyor pump means and both the intake of said injection pump means and said second inlet means of said nozzle.

4. The combination defined in claim 3 wherein said filtering means comprise a single filtering unit having an inlet in communication with the exhaust of said conveyor pump means and two outlets one of which is in communication with the intake of said injection pump means and the other of which is in communication with said second inlet means of said nozzle.

5. The combination defined in claim 4 further comprising pressure-responsive valve means interposed between said other outlet of said filtering unit and said second inlet means of said nozzle.

References Cited in the file of this patent

UNITED STATES PATENTS

| | | |
|---|---|---|
| 1,982,023 | Ritz | Nov. 27, 1934 |
| 2,727,498 | Reiners | Dec. 20, 1955 |